United States Patent [19]

Snell

[11] 4,205,219

[45] May 27, 1980

[54] DOUBLE GROOVED WELDING BACKUP

[75] Inventor: John B. Snell, Lake Elmo, Minn.

[73] Assignee: Minnesota Mining and Manufacturing Company, St. Paul, Minn.

[21] Appl. No.: 913,511

[22] Filed: Jun. 7, 1978

[51] Int. Cl.² .......................... B23K 5/22; B23K 9/02
[52] U.S. Cl. .................................... 219/160; 228/216
[58] Field of Search ................... 219/160; 228/50, 216

[56] References Cited

U.S. PATENT DOCUMENTS

| 1,513,472 | 10/1924 | Whomes | 228/50 |
|---|---|---|---|
| 2,820,427 | 1/1958 | Chyle et al. | 228/50 |
| 2,916,001 | 12/1959 | Chyle et al. | 228/50 |
| 3,001,057 | 9/1961 | Hackman et al. | 219/127 |
| 3,138,863 | 6/1964 | Clark et al. | 228/216 |
| 3,229,884 | 1/1966 | Franklin et al. | 219/160 |
| 3,372,852 | 3/1968 | Cornell | 219/160 X |

FOREIGN PATENT DOCUMENTS 393066  11/1974  U.S.S.R. .................................. 228/50

Primary Examiner—B. A. Reynolds
Assistant Examiner—Keith E. George
Attorney, Agent, or Firm—Cruzan Alexander; Donald M. Sell; Dean P. Edmundson

[57] ABSTRACT

A double grooved, preferably ceramic, welding backup is provided. The welding backup has a generally planar working face with parallel grooves, the grooves being separated by a central ridge, there being substantially flat lands at the sides of the grooves.

14 Claims, 5 Drawing Figures

DOUBLE GROOVED WELDING BACKUP

BACKGROUND OF THE INVENTION

This invention relates to welding methods and to a novel backup for use therein; the invention is particularly concerned with single pass, high temperature, high current, or heavy plate welding.

In the manufacture of large tanks, ships, etc., metal plates are often joined together by abutting their edges and joining them with a weld seam. It is highly desirable, if not absolutely essential, that there be a complete penetration from face to root (i.e., from the welding side to the opposite side) of the welded material. To insure that a 100% weld seam is formed (i.e., that the weld material penetrates completely from the face to the root) one conventional practice has been to form the weld seam by welding in multiple passes on each side of the plates to be joined. This procedure produces sound welds, but is expensive and time consuming because of the need to weld from two sides.

Various methods have been proposed which permit metal plates to be welded from one side. For example, rectangular, square or bar-like welding backups have been employed. A welding backup is centrally positioned behind the plates to be welded so as to contain the molten material generated in the welding process. As the molten material cools it solidifies into a weld seam or "bead" that requires no additional welding from the opposite side of the plates. Metallic backup bars made from copper or a metal similar to the plate to be welded have been used in combination with an inorganic parting layer. This combination prevents the joining of the backup to the weld.

Non-metallic welding backups are particularly advantageous, as described in R. H. Keith "Weld Backings Come of Age" June 1975, Welding Journal, p. 422; since they do not involve many of the cost and implementation disadvantages of metallic weld backings. Heat resistant tapes, e.g., as described in U.S. Pat. No. 3,001,057 (Hackman et al); and U.S. Pat. No. 3,138,863 (Clark et al) and rigid heat resistant ceramic tile or glass materials, e.g., as described in U.S. Pat. No. 2,820,427 (Chyle et al) are exemplary non-metallic welding backup materials. The present invention relates generally to non-metallic (e.g., ceramic) welding backups.

Conventional ceramic welding backups generally have working surfaces that are either flat or that have a single longitudinal groove therein. Referring to FIG. 1, two relatively heavy (e.g. 12 mm or over) parent metal plates 10 have been positioned in slightly spaced apart relationship so that they may be welded from above. A prior art ceramic welding backup 12 having an essentially flat working surface 14 is positioned beneath plates 10 so as to contain a puddle of molten weld material 11 (i.e., parent metal, filler metal and welding flux) generated in the "V" defined by the angle cut plate edges 16. The heat generated in welding melts the weld material and in turn the ceramic tile 12 (the melted portions of the plates 10 and backup 12 being shown in phantom) thus creating in the tile a central zone of melted ceramic. As the ceramic material is melted, the more dense weld material displaces the melted ceramic creating on the tile working surface a concave channel 18. The displaced hot ceramic material, in turn, displaces molten parent metal producing indentations or undercuts 20 in the parent metal plate. As the molten metal and ceramic material cool, highly undesirable undercut welds corresponding to indentations 20 remain when the ceramic backup is removed.

In an attempt to eliminate the formation of undercut welds which tend to diminish the strength of a weld seam, ceramic backup tiles having single longitudinal grooves have previously been employed. As depicted in FIG. 2, a ceramic backup tile 22 having on its working face 24 a single groove 26 (shown in phantom) is positioned beneath the spaced-apart plates 10 so as to cooperate therewith to contain a puddle of molten weld material 11. As described above, the molten weld material melts the ceramic backup. However, little or no ridges or undercuts are formed because the molten weld materials and molten ceramic flow into the groove 26 and thus are not deleteriously forced against the plates 10. Unfortunately conventional back-up tiles that are grooved deeply enough and wide enough to prevent the formation of undercut welds produce a large and equally objectionable backside reinforcement 28. Backside reinforcements which are too large must be machined off, requiring additional labor and expense.

The present invention provides grooved, preferably ceramic, welding backups that reduce the tendency to form undercut welds, and produce a relatively small backside reinforcement. Moreover, the present invention provides welding backups which permit the maximum thickness of the backup to be positioned adjacent the hottest sector of the weld, thereby minimizing backup burn-through (i.e., burning through the backup by the molten weld material).

SUMMARY OF THE INVENTION

The present invention provides heat-resistant welding backups (preferably comprising a rigid, ceramic material) which are essentially "W" shaped in transverse cross-section. More particularly, the present invention provides, in one aspect, a heat-resistant welding backup having a broad, generally planar working face, said working face having parallel grooves therein, a central ridge disposed between said grooves and substantially flat lands at the sides of said grooves. In a preferred embodiment, the present welding backup comprises a ceramic tile, the tile having two generally planar, parallel faces, one of the planar faces being the working face. In another embodiment the present welding backups are adapted to interconnect with similarly adapted backups in a continuous flexible chain or train that is capable of conforming to concave, convex and irregular surfaces which are to be joined by means of a one-side weld.

BRIEF DESCRIPTION OF THE DRAWINGS

The present invention is described in greater detail hereinafter with reference to the accompanying drawings wherein like reference characters refer to the same elements in the same views and in which.

DETAILED DESCRIPTION OF THE INVENTION

Figure 3:
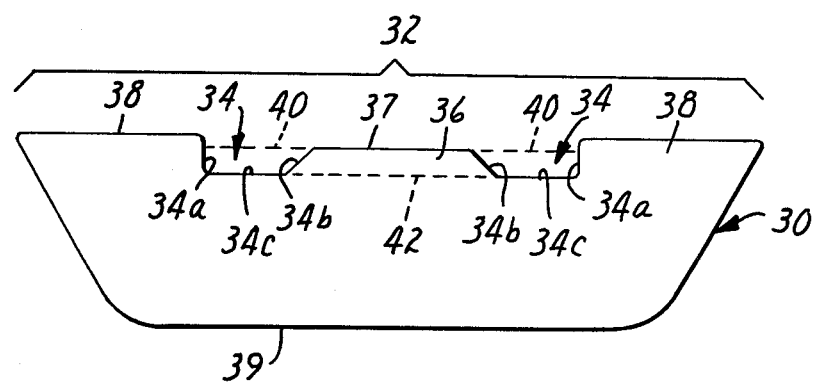
FIG. 3 is a cross-sectional view of a welding backup of the present invention.

Depicted in FIG. 3 is a cross-sectional view of a preferred ceramic welding backup of the invention, the backup 30 having a generally planar working face 32, the working face 32 having therein generally parallel grooves 34 (defined by groove sides 34a, 34b and the bottom or floor 34c of the groove 34), a central ridge 36 disposed between the grooves and the substantially flat lands 38 at the sides of the grooves. This embodiment of the welding backup has a second planar face 39 which is generally parallel to the working face 32. As explained below, it is preferred that the total volume of the grooves below the apex 37 of ridge 36 be equal to or greater than the total volume of the central ridge above groove floor 34c. In this embodiment, the total volume of the grooves is the product of the total length of both grooves and the area of the polygon defined by groove sides 34a and 34b and groove floor 34c and dotted line 40 which is extrapolated from the apex 37 of ridge 36 to groove side 34a. The "depth of the groove" is the vertical distance from the bottom of the groove 34c to flat lands 38. The volume of the central ridge is the product of the length of the central ridge and the area of the polygon defined by right and left groove sides 34b, dotted line 42 which is extrapolated from groove floor 34c and the apex 37 of ridge 36. The "height of the ridge" is the vertical distance from dotted line 42 to the apex 37 of ridge 36.

Figure 1:
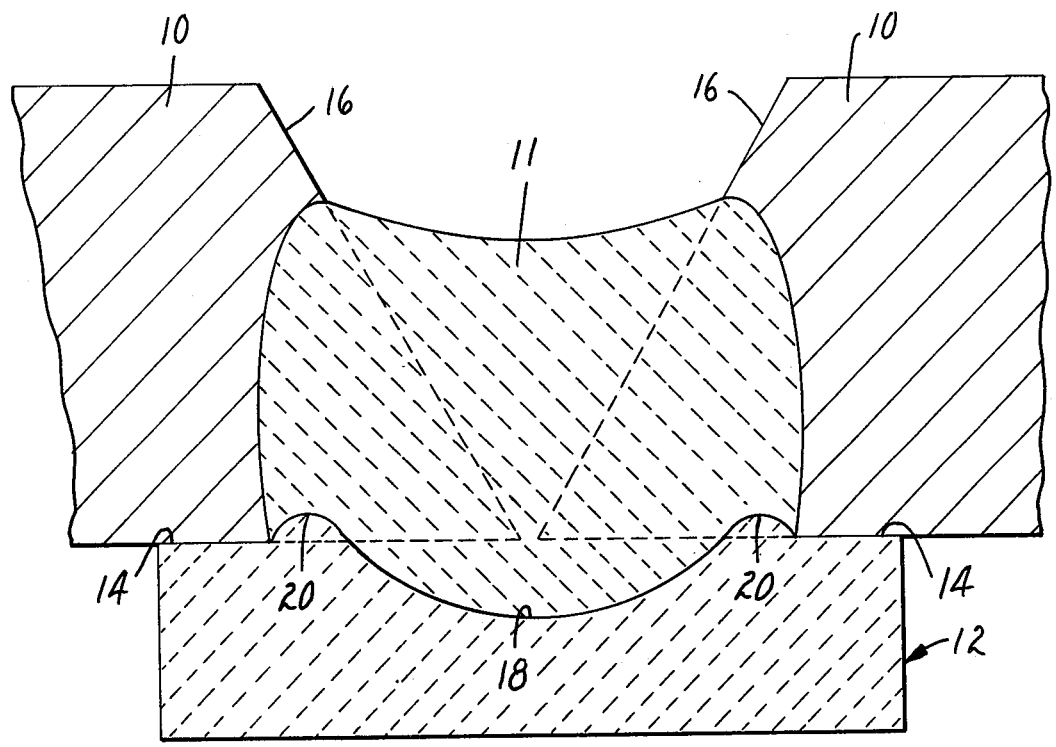
FIGS. 1 and 2 are representative prior art welding backups as discussed above.
Figure 4:
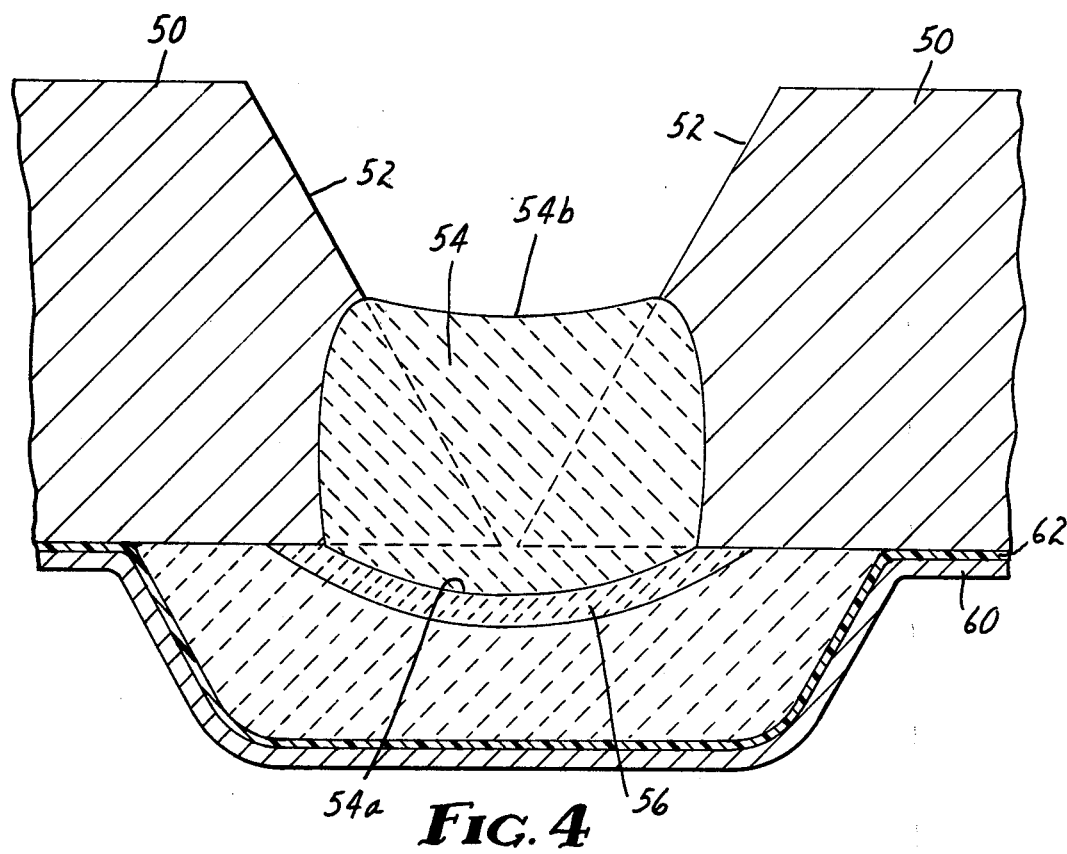
FIG. 4 is a cross-sectional view of a completed one-side weld, single pass employing the welding backup of FIG. 3.

Depicted in FIG. 4 is a completed root weld (a single pass weld from one side of the plate which produces a preliminary weld seam that may be thickened in a second pass from the same side) using the weld backup 30 of FIG. 3. Two relatively thick (e.g. greater than 12 mm) parent metal plates 50 with angle cut edges 52 were positioned so as to be slightly spaced apart with a welding backup (as in FIG. 3) centrally located behind the plates, the central ridge 36 of the backup being aligned with the space between the plates. A conventional welding process such as submerged arc was employed to produce a mass of molten welding material 54 contained by the backup 30 and the plates 50. As the molten weld material flows between the plates and contacts the ceramic backup, the thicker central ridge 36 of the backup is melted and flows into the grooves 34. As noted above, the total volume of the two grooves is preferably equal to or greater than the volume of the central ridge. When the total volume of the grooves is equal to or greater than the volume of the central ridge, all of the ridge can be melted and flow into the grooves without the molten ceramic deleteriously contacting the plates 50 and generating undercut welds. Additionally, no excessively large backside reinforcement develops because the volume of molten weld material that flows to the backside of the plates is reduced by the volume occupied by the central ridge. The ceramic backup contains the mass of welding material 54 and itself melts in such a manner that upon cooling, a uniformly rounded weld seam having a thin, rounded backside weld 54a and uniform frontside weld 54b is generated. Between the backup and the backside weld 54a a zone of resolidified glassy ceramic material 56 develops. (For clarity, the zone of resolidified ceramic was omitted from FIGS. 1 and 2.) Using the present novel backup, a sound root weld which requires little or no subsequent rework is formed in a single pass.

The welding backup of the present invention may be externally supported adjacent the plates to be joined, e.g., by the use of magnetic or suction clamps, or the backup may be made self-supporting. A preferred means of supporting the backup is a flexible heat resistant backing 60 having thereon a pressure sensitive adhesive 62, the adhesive adhering the tiles to the backing, and the backing to the metal plates. During shipping and storage, pressure sensitive adhesive 62 which is to adhere the backup to the metal plate may be protected from contamination by covering it with a disposable low adhesion liner. Flexible backings and adhesives suitable for use in the present invention are extensively discussed in U.S. Pat. No. 3,372,852 (Cornell), the teachings of which are incorporated by reference herein.

The welding backups of the present invention may be manufactured from any heat-resistant material. Heat-resistant materials such as woven glass fiber or granular (e.g., sand) materials in various binders may be used to fabricate the present welding backups. Preferred materials in the practice of the present invention include rigid magnesia-alumina-silica ceramics (especially ceramic tiles) such as forsterite, cordierite, or steatite. Any of a number of processes such as machining, casting, dry-pressing or extrusion may be employed to fabricate the present welding backups from the preferred materials, these processes being well known to one skilled in the art. The fabrication techniques preferably employed herein are dry pressing or extrusion.

In a preferred arrangement, a plurality, chain or train of the welding backups of the present invention may be aligned on a flexible heat resistant backing. The ends of the present backup may be fabricated so as to be capable of being linked together to form a flexible chain on a backing which can be positioned adjacent flat, concave, convex, irregular, etc. metal plates to be welded. Assignee's pending patent applications entitled, "Pivotably Interlocking Rigid Heat-Resistant Tiles", Ser. No. 905,152 filed on May 12, 1978, in the name of Roger H. Keith, and "Welding Backup Employing a Train of Knuckle-Joint Tiles", Ser. No. 905,153 filed on May 12, 1978, in the name of John B. Snell, disclose techniques for forming rigid, ceramic welding backups into flexible chains. The disclosure of these two patent applications is incorporated by reference herein.

Figure 5:
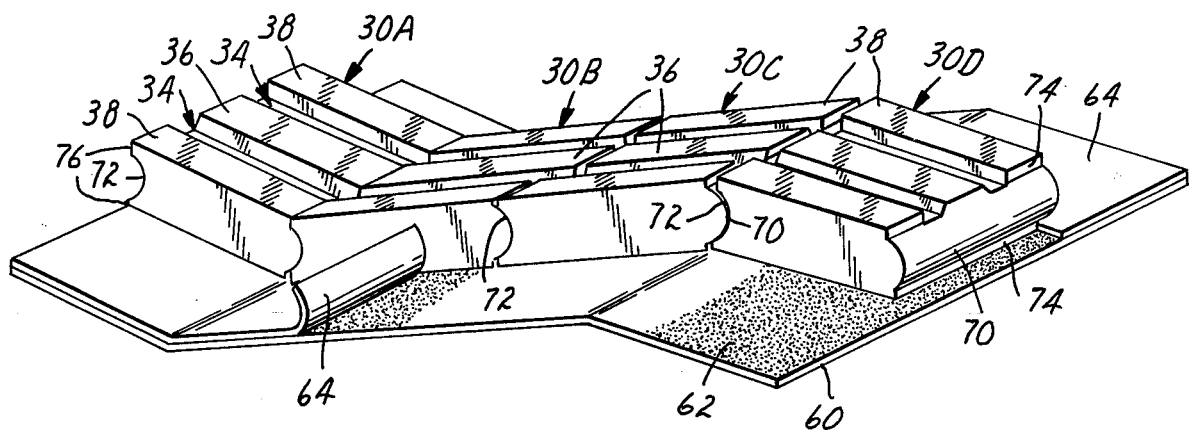
FIG. 5 is a schematic isometric view of a plurality of the welding backups of the invention aligned on a flexible backing.

Depicted in FIG. 5 is an example of one means by which, according to the technique disclosed in said pending application Ser. No. 905,153, a plurality of the welding backups of the present invention may be linked together to form a flexible chain on a flexible heat resistant backing. A train of generally flat ceramic welding backups 30A, 30B, 30C and 30D, each backup having two parallel grooves 34, a central ridge 36 and substantially flat lands 38 positioned in contiguous end-to-end relationships extends centrally the full length of flexible, heat resistant backing 60. A pair of disposable low adhesion liners or webs 64 protect adhesive coating 62 from contamination during shipping and storage. A convex cylindrical surface 70 is at one end of each backup, and a concave cylindrical surface 72 is at the other end of each backup. Each cylindrical surface approximates a semi-cylinder and terminates at a stop provided by a shoulder 74 at each end of the convex surface 70 and a ledge 76 at each end of the concave surface 72. Each contiguous pair of backups forms a knuckle joint having semi-cylindrical mating surfaces on substantially a common center of axis through substantially the center of a backup. The adjacent shoulders 74 and ledges 76 are set back to limit the knuckle motion in either direction to about 12 degrees beyond collinear alignment. By removing the disposable webs 64 and adhering the flexible backing bearing backups 30A, 30B, 30C and 30D to adjacent flat, concave, convex, irregular, etc., metal plates to be welded, a sound root weld may be formed on a complex surface in a single pass. Further description of the techniques of linking a plurality of welding backups in the form of a chain will be omitted in the interest of brevity, further details of such techniques being given in said pending applications Ser. Nos. 905,152 and 905,153.

The practice of this invention is illustrated in the following example which should not be construed to limit the scope thereof.

EXAMPLE

Figure 2:
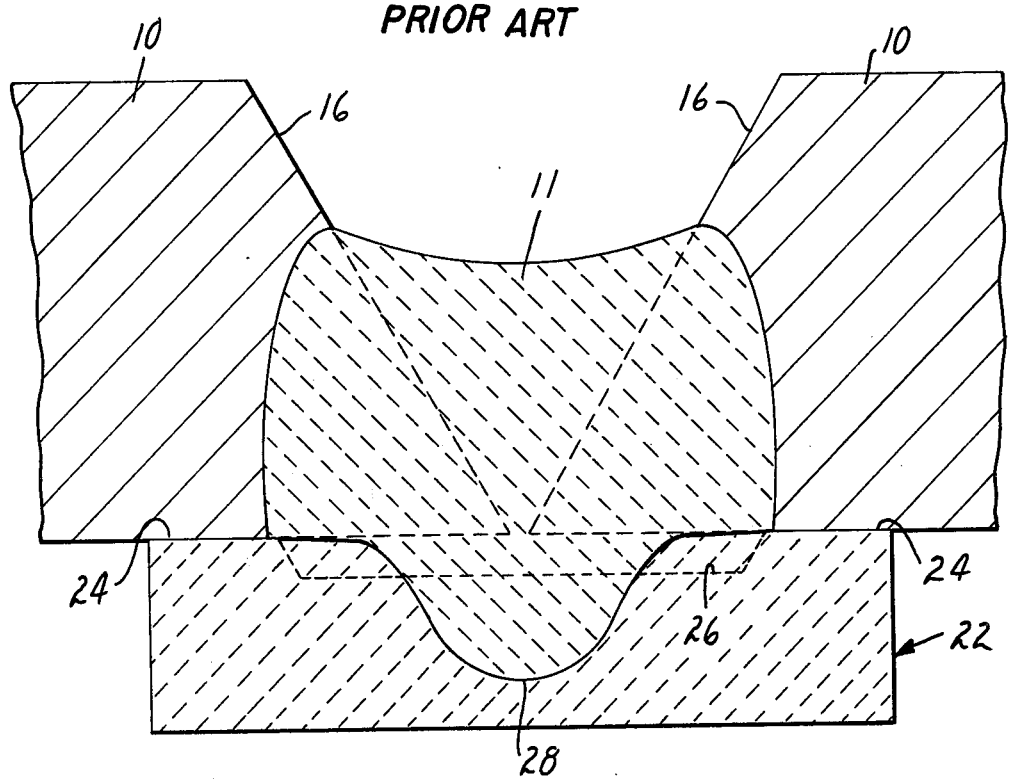

The backup 30 of FIG. 3 was made from a square cordierite ceramic tile 33 mm in width and 7.9 mm in thickness. The two parallel grooves 34 were sawed to 2.4 mm in depth, 5.6 mm width at the top and 4.0 mm width at the bottom. The central ridge was 6.4 mm wide at the top, 9.5 mm at the base and its apex was 1.6 mm above the bottoms of the grooves. When used as a backup for welding 19 mm thick mild steel plates with the submerged arc process, a nearly perfect weld was made, the weld having only a trace of undercuts and having a backside reinforcement 1.6 mm to 3.2 mm in thickness which was considered to be ideal. In contrast, when a similar weld was made using a prior art tile with a rectangular uniform groove 1.6 mm wide by 2.0 mm deep (as shown in FIG. 2) the backside reinforcement was 3.2 mm to 4.8 mm in thickness. When a similar weld was made using a prior art tile having a shallower uniform rectangular groove 16 mm wide and 0.8 mm deep, extensive undercutting resulted.

What is claimed is:

1. A heat-resistant welding backup having a broad, generally planar working face, said working face having parallel grooves therein, a central ridge disposed between said grooves and substantially flat lands at the sides of said grooves, wherein the total volume of those portions of said grooves lying below the apex of said ridge is equal to or greater than the volume of said ridge.

2. A welding backup according to claim 1 wherein said backup has two generally planar faces, said faces being generally parallel, one of said faces being said working face.

3. A welding backup according to claim 1 wherein said backup has a uniform and symmetrical transverse cross-section.

4. A welding backup according to claim 1 wherein the height of said ridge exceeds one-third the depth of said grooves.

5. A welding backup according to claim 1 wherein said backup comprises glass.

6. A rigid, heat-resistant, ceramic welding backup having a broad, generally planar working face, said working face having parallel grooves therein, a central ridge disposed between said grooves and substantially flat lands at the sides of said grooves, wherein the total volume of those portions of said grooves lying below the apex of said ridge is equal to or greater than the volume of said ridge.

7. A welding backup according to claim 6 wherein said welding backup has two generally planar faces, said faces being generally parallel, and one of said faces being said working face.

8. A welding backup according to claim 6 wherein said backup comprises glass.

9. A plurality of welding backups according to claim 6 wherein the ends of said backups are adapted so as to be capable of interconnecting to form a continuous chain.

10. A rigid, heat-resistant ceramic welding backup having two generally planar faces, said faces being generally parallel, one of said faces being a working face, said working face having parallel grooves therein, a central ridge disposed between said grooves and substantially flat lands at the sides of said grooves wherein the total volume of said grooves lying below the apex of said ridge is equal to or greater than the volume of said ridge.

11. A welding backup according to claim 10 wherein the ends of said backup have been adapted so as to be capable of interconnecting with similarly adapted welding backups to form a flexible chain.

12. An improved heat resistant welding backup useful in welding two slightly spaced apart plates, said backup having a generally planar working face with two parallel grooves therein, a central ridge disposed between said grooves and substantially flat lands at the sides of said grooves, said ridge adapted to be aligned with the space between said plates and to be melted upon contact with molten weld material to thereupon flow as a melt into said grooves.

13. A welding backup according to claim 12 wherein the total volume of those portions of said grooves lying below the apex of said ridge is equal to or greater than the volume of said ridge.

14. A welding backup according to claim 12 wherein the ends of said backup have been adapted so as to be capable of interconnecting with similarly adapted welding backups to form a flexible chain.

* * * * *